(12) United States Patent
Wakashiro et al.

(10) Patent No.: US 7,074,157 B2
(45) Date of Patent: Jul. 11, 2006

(54) CONTROL APPARATUS FOR HYBRID VEHICLE

(75) Inventors: Teruo Wakashiro, Shioya-gun (JP);
Masanobu Asakawa, Utsunomiya (JP);
Kohei Hanada, Utsunomiya (JP);
Manabu Niki, Utsunomiya (JP);
Toshitaka Hachiro, Utsunomiya (JP);
Tomohiro Nishi, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 215 days.

(21) Appl. No.: 10/880,552

(22) Filed: Jul. 1, 2004

(65) Prior Publication Data

US 2005/0003925 A1    Jan. 6, 2005

(30) Foreign Application Priority Data

Jul. 4, 2003  (JP) ............................. 2003-192306

(51) Int. Cl.
*H02P 7/00*     (2006.01)
(52) U.S. Cl. ............................. 477/7; 477/2; 180/65.2; 180/65.3
(58) Field of Classification Search .................... 477/2, 477/3, 7; 180/65.2, 65.3, 65.4
See application file for complete search history.

(56) References Cited

U.S. PATENT DOCUMENTS 6,312,357 B1 * 11/2001 Sakai et al. .................... 477/37
6,612,965 B1 * 9/2003 Yasuoka et al. ............... 477/37
6,830,533 B1 * 12/2004 Inoue et al. .................... 477/37

FOREIGN PATENT DOCUMENTS

| EP | 1067003 | * | 1/2001 |
| JP | 9-163509 | | 6/1997 |
| JP | 10-215503 | | 8/1998 |
| JP | 2002-70599 | | 3/2002 |
| JP | 2004-68759 | | 3/2004 |

* cited by examiner

*Primary Examiner*—Ha Ho
(74) *Attorney, Agent, or Firm*—Arent Fox PLLC (57) ABSTRACT

A motor charge-discharge torque limit correction coefficient for during cylinder deactivation enlargement assistance, which changes with an increasing trend according to an increase in a regeneration/assistance integrated residual amount which is an integrated value of the energy amount obtained during deceleration regeneration of vehicle, that is a correction coefficient which corrects to decrease an energy management discharge torque limit which is an upper limit value of motor torque set according to for example, an energy state in high voltage electrical equipment and an operating state of the vehicle, when assisting the output from the internal-combustion engine by the motor, is calculated. A value obtained by correcting the energy management discharge torque limit is set to an energy management discharge torque limit for cylinder deactivation enlargement assistance, and a cylinder deactivation upper limit ENG torque is added so as to calculate a cylinder deactivation upper limit torque.

2 Claims, 8 Drawing Sheets

CONTROL APPARATUS FOR HYBRID VEHICLE

BACKGROUND OF THE INVENTION

1. Field of the Invention

The present invention relates to a control apparatus for a hybrid vehicle which is mounted in a hybrid vehicle propulsion driven by jointly using an internal-combustion engine and a motor, and wherein the driving force from at least one of the internal-combustion engine and the motor is transmitted to the driving wheels.

This application is based on Japanese Patent Application No. 2003-192306, the contents of which are incorporated herein by reference.

2. Description of Related Art

Conventionally, for example, in a hybrid vehicle which comprises an internal-combustion engine and a motor as a power source and wherein the driving force from at least one of the internal-combustion engine and the motor is transmitted to the driving wheels for propulsion, a control apparatus for a hybrid vehicle has been well known which calculates the throttle opening for minimizing the fuel consumption of the internal-combustion engine with respect to the rotating speed of the input shaft of the transmission, and based on this throttle opening and the accelerator operation amount of a driver, allocates the torque required by the power plant (that is, the internal-combustion engine and the motor), into the engine torque required by the internal-combustion engine and the motor torque required by the motor (for example, refer to Japanese Unexamined Patent Application, First Publication No. Hei 9-163509).

Furthermore, in such a hybrid vehicle, there is known a control apparatus for a hybrid vehicle comprising an internal-combustion engine capable of being switched between an all cylinders operation which operates all cylinders and a partial cylinders deactivation operation which deactivates some of the cylinders (cylinders deactivation operation) as an internal-combustion engine low fuel consumption, which is aimed at improve the fuel consumption efficiency by performing the cylinders deactivation operation in the case where cylinders deactivation is possible such as during low speed travel.

Incidentally, in a control apparatus for a hybrid vehicle according to an example of the conventional technology, for example, there is a likelihood that, if the region capable the cylinders deactivation operation of the internal-combustion engine is enlarged by means of the assisting operation of motor, the assisting operation of the motor will be executed during medium load travel in urban areas with relatively higher travelling frequency compared to with high load travel on an uphill road, resulting in an increase in the frequency where the power storage device which transfers the electric energy with the motor comes into a state having a discharging trend. Consequently, for example at the time of acceleration of the vehicle, it becomes difficult to perform the desired assisting operation by the motor.

Furthermore, in the case where there is a likelihood of the power storage unit reaching an over discharging state, it is necessary to operate the motor as a generator by the output from the internal-combustion engine so as to charge the power storage unit, resulting in a problem that the fuel consumption efficiency is deteriorated, if the execution frequency of this power generation is increased.

SUMMARY OF THE INVENTION

The present invention takes the above situation into consideration, with the object of providing a control apparatus for a hybrid vehicle in which fuel consumption efficiency can be improved.

In order to solve the above problem and achieve the related object, a first aspect of the present invention is a control apparatus for a hybrid vehicle which comprises an internal-combustion engine and a motor as a power source, and a power storage unit which transfers electric energy with the motor (for example, a battery 3 in an embodiment), and at least one of the internal-combustion engine and the motor is connected to driving wheels of the vehicle through a transmission so as to transmit a driving force to the driving wheels, wherein the control apparatus comprises: an upper limit motor torque calculating device (for example, step S11 to step S14 in the embodiment) which sets an upper limit value of motor torque capable of being output from the motor during an assisting operation which assists the output of the internal-combustion engine by the output from the motor (for example, energy management discharge torque limit TQMEMLTD in the embodiment), according to an energy state in high voltage electrical equipment constituting the power storage unit; a regeneration/assistance amount integrated value calculating device (for example, step S01 to step S09 in the embodiment) which calculates a regeneration/assistance amount integrated value (for example, regeneration/assistance integrated residual amount DQBATRGN in the embodiment), corresponding to an integrated value of a value obtained by subtracting the energy consumption in the vehicle from a deceleration regenerative energy generated due to the regenerating operation of the motor during vehicle deceleration, based on the state of charge of the power storage unit; a correction coefficient setting device (for example, step S15 in the embodiment) which sets a correction coefficient which corrects for a decrease in the upper limit value of the motor torque according to the regeneration/assistance amount integrated value (for example, the motor charge-discharge torque limit correction coefficient during cylinder deactivation enlargement assistance KCSADQB in the embodiment); and a motor assistance region decreasing device (for example, step S16 in the embodiment) which restricts the motor torque to below a correction upper limit value obtained by correcting the upper limit value of the motor torque by the correction coefficient (for example, the energy management discharge torque limit for cylinder deactivation enlargement assistance TQMLTCSA in the embodiment).

According to the control apparatus for a hybrid vehicle of the above construction, for example, by performing the assisting operation according to the regeneration/assistance amount integrated value corresponding to the integrated value of the value obtained by subtracting the energy consumption in the vehicle from the deceleration regenerative energy generated due to the regenerating operation of the motor during vehicle deceleration, that is the consumable energy amount due to the assisting operation of motor, out of the deceleration regenerative energy collected by the deceleration regeneration of motor, the state of charge of the power storage unit is kept from being excessively decreased. Therefore, for example, the desired assisting amount may be maintained during the high load travelling, for example due to the output from the internal-combustion engine E, the power may be generated in the motor, and the frequency for charging the power storage unit may be decreased so as to improve the fuel consumption efficiency.

Furthermore, a control apparatus for a hybrid vehicle according to a second aspect of the present invention is one wherein the internal-combustion engine is capable of being switched between an all cylinders operation which operates all cylinders and a cylinders deactivation operation which partially deactivates the cylinders operation, and the control apparatus comprises; a cylinders deactivation operation region enlarging device (for example, step S24 in the embodiment) which sets a value obtained by adding to the motor torque an upper limit value (for example, cylinder deactivation upper limit ENG torque TQCS in the embodiment) of an engine torque capable of being output from the internal-combustion engine during the cylinders deactivation operation, to a cylinder deactivation upper limit torque which is the upper limit determination threshold when determining whether it is possible to execute the cylinders deactivation operation or not (for example, cylinder deactivation upper limit torque TQACS in the embodiment); a cylinders deactivation operation controlling device (for example, step S29 in the embodiment) which sets the internal-combustion engine to the cylinders deactivation operating state in the case where a target torque (for example the power plant required torque final value TQPPRQF in the embodiment) with respect to a crank end torque which is the torque at the shaft end of the crankshaft, of the power plant torque output from the power plant comprising the internal-combustion engine and the motor, is less than the cylinder deactivation upper limit torque; and a cylinders deactivation assistance region decreasing device (for example, step S24 in the embodiment) which restricts, when operating the cylinders deactivation operation region enlarging device, the motor torque to a value under the correction upper limit value obtained by the motor assistance region decreasing device.

Furthermore, according to the control apparatus for a hybrid vehicle of the above construction, when enlarging the cylinders deactivation operation region by increasing the cylinder deactivation upper limit torque to greater then the upper limit value of the engine torque, by the assisting operation of motor, the assisting operation is performed according to the regeneration/assistance amount integrated value, that is the consumable energy amount due to the assisting operation of motor, of the deceleration regenerative energy collected by the deceleration regeneration of motor, so that the fuel consumption efficiency may be kept from being deteriorated. That is, for example, the cylinders deactivation operation region is kept from being enlarged by the generation energy obtained by generation in the motor due to the output from the internal-combustion engine, so that the fuel consumption in the internal combustion engine can be reduced.

DETAILED DESCRIPTION OF THE INVENTION

Hereunder is a description of a control apparatus for a hybrid vehicle according to an embodiment of the present invention with reference to the appended drawings.

Figure 1:
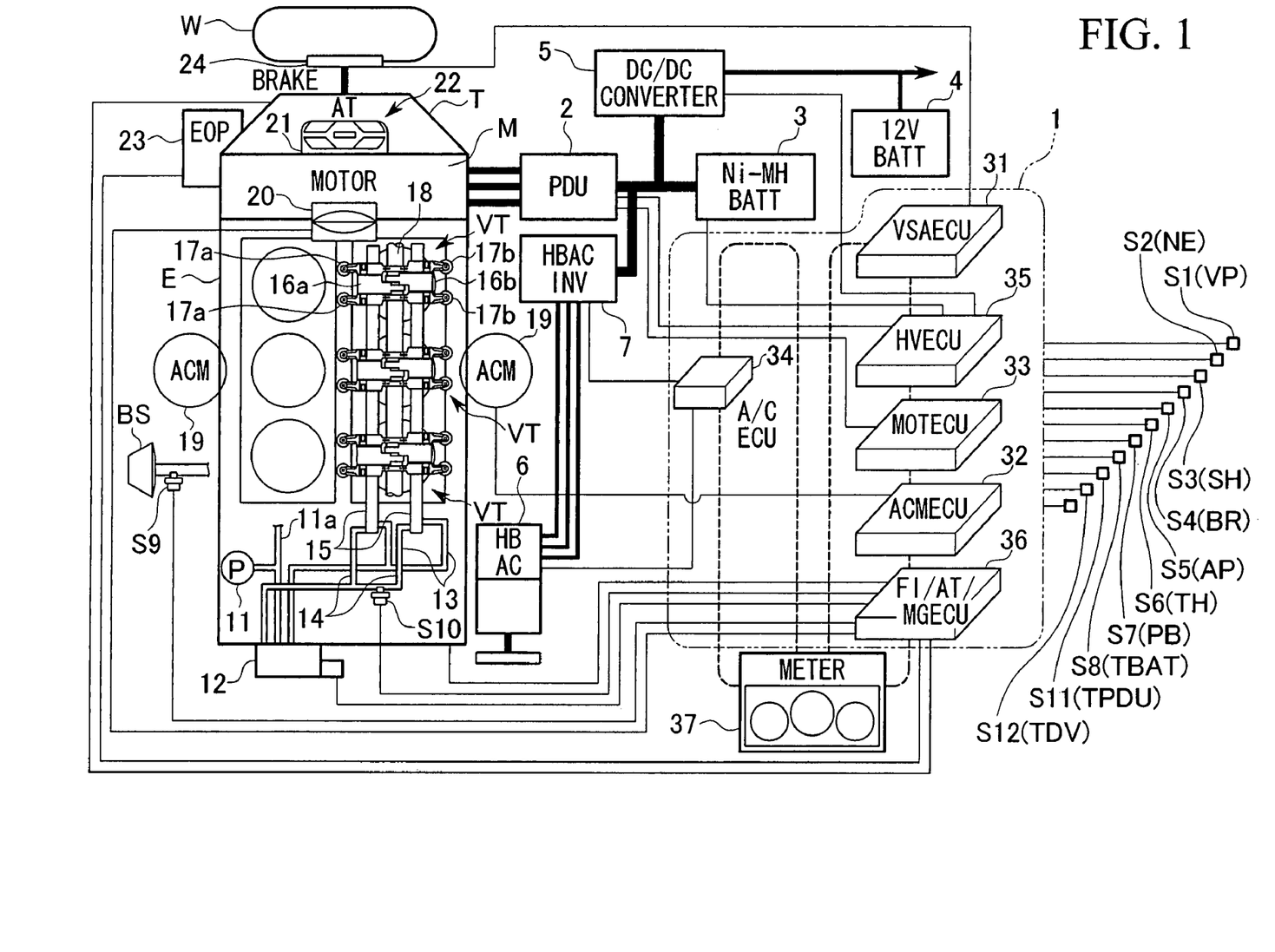
FIG. 1 shows a construction of a control apparatus for a hybrid vehicle according to an embodiment of the present invention.

FIG. 1 shows a parallel hybrid vehicle according to the embodiment of this invention having a construction where an internal-combustion engine E, a motor M, and a transmission T are connected directly in series. The driving force of both the internal-combustion engine E and the motor M is transmitted, for example, from the transmission T such as an automatic transmission (AT) or manual transmission (MT),) to the driving wheels W of the vehicle, via a differential gear (not shown) which distributes the driving force between driving wheels W on the right and the left (front wheels or rear wheels. Moreover, when a driving force is transmitted from the driving wheel W side to the motor M side at the time of deceleration of the hybrid vehicle, the motor M functions as a generator to generate so-called regenerative braking, and the kinetic energy of the vehicle body is recovered as electrical energy.

The motor M, being for example a three-phase brushless DC motor or the like, is connected to a power drive unit (PDU) 2. The power drive unit 2 comprises, for example a PWM inverter involving pulse width modulation (PWM), installed with a bridge circuit being a bridge connected using a plurality of transistor switching elements, and is connected to a nickel-hydrogen battery (battery) 3 of a high voltage system which transfers the power for the motor M (the power supply which is supplied to the motor M during the power running operation (driving or assisting) of the motor M, or the regenerated power which is output from the motor M during the regenerative operation). Moreover, the drive and regenerative operation are performed by the power drive unit 2 receiving control instructions from a control unit 1. That is, for example when driving the motor M, based on torque instructions input from the control unit 1, the power drive unit 2 converts the DC power output from the battery 3 into three-phase AC power and supplies this to the motor M. On the other hand, during the regenerative operation of the motor M, the three-phase AC power output from the motor M is converted into the DC power and the battery 3 is charged.

Furthermore, an auxiliary battery 4 of 12 volts for driving various accessories, is connected to the power drive unit 2 and the battery 3 in parallel via a downverter 5 which is a DC-DC converter. The downverter 5 is controlled by the control unit 1 and charges the auxiliary battery 4 by lowering the voltage of the power drive unit 2 or the battery 3.

Moreover, a crankshaft of the internal-combustion engine E is connected, for example through a belt or a clutch to a rotation shaft of an air conditioning motor (not shown) equipped in a hybrid air conditioning compressor (HBAC) 6. This air conditioning motor is connected to an air conditioning inverter (HBAC INV) 7. The air conditioning inverter 7 is connected in parallel to the power drive unit 2 and the battery 3, and under the control of the control unit 1, converts the DC power output from the power drive unit 2 and the battery 3 into three-phase AC power to supply to the air conditioning motor so as to drive control the hybrid air conditioning compressor 6.

That is, in the hybrid air conditioning compressor 6, the driving load, for example the discharge of the refrigerant, is variably controlled under the driving force from at least one of the internal-combustion engine E and the air conditioning motor during the power running operation of the air conditioning motor. Here, "hybrid" in the hybrid air conditioning compressor 6 means that it can be driven by either one of the internal-combustion engine E and the motor M.

Between the internal-combustion engine E and the air conditioning motor, there are for example, a crankshaft pulley integrally provided with the crankshaft of the internal-combustion engine E, a driving shaft pulley paired with the crankshaft pulley and integrally provided with a driving shaft connectable with the rotation shaft of the air conditioning motor through a clutch, and a belt spanning between the crankshaft pulley and the driving shaft pulley. That is, between the crankshaft pulley and the driving shaft pulley, the driving force is transmitted through the belt.

Moreover, the internal-combustion engine E is a so-called SOHC V6 cylinder engine, of a construction having three cylinders on one bank comprising a variable valve timing mechanism VT enabling a cylinder deactivation operation, and a construction having three cylinders on the other bank comprising a normal valve operating mechanism (not shown) which does not perform the cylinder deactivation operation. Furthermore, the three cylinders enabling the cylinder deactivation operation have a construction such that respective two inlet valves and two exhaust valves are able to maintain the closed state by means of the variable timing mechanism VT, via an oil pressure pump 11, a spool valve 12, a cylinder deactivation side path 13, and a cylinder deactivation cancellation side path 14. That is, the internal-combustion engine E may be switched between three cylinders operation (cylinder deactivation operation) in the state such that the three cylinders on one side bank are deactivated, and six cylinders operation (all cylinders operation) such that all six cylinders on both side banks are driven.

Specifically, if operating oil being supplied from the oil pressure pump 11 through the lubrication system piping 11*a* to the engine lubrication system is partially supplied via the spool valve 12 comprising a solenoid controlled by the control unit 1, to the cylinder deactivation side path 13 on the bank capable of cylinder deactivation operation, a cam lift rocker arm 16*a* (16*b*) and valve drive rocker arms 17*a* (17*b*) which are supported on the respective rocker shafts 15 and were integrally driven, are able to be driven separately. Therefore, the driving forces of the cam lift rocker arms 16*a* and 16*b* driven by the rotation of the cam shaft 18 are not transmitted to the valve drive rocker arms 17*a* and 17*b*, so that the inlet valves and the exhaust valves remain in the closed state. Accordingly the cylinder deactivation operation where the inlet valves and the exhaust valves of the three cylinders become in the closed state may be performed. The internal-combustion engine E is mounted via a damping device (ACM: Active Control Engine Mount) 19 onto the vehicle so that the damping device 19 can suppress the generation of vehicle vibration accompanied with the operating state of the internal-combustion engine E, that is the switching of the three cylinders operation (cylinder deactivation operation) and the six cylinders operation (all cylinders operation).

Moreover, this internal-combustion engine E comprises an electronic throttle control system (ETCS) 20 which electronically controls a throttle valve (not shown).

The ETCS 20 drives an ETCS driver according to the throttle opening calculated in the control unit 1 based for example on the accelerator pedal opening related to the operating amount of the accelerator pedal (not shown) by a driver, the operating state of the vehicle such as the vehicle travelling speed (vehicle speed) VP or the engine speed NE, and on the torque distribution between the internal-combustion engine E and the motor M, so as to directly control the throttle valve.

For example the transmission T being the automatic transmission (AT) is constructed to comprise a torque converter 22 equipped with a lock-up clutch (LC) 21, and an electric oil pump 23 which generates the oil pressure for drive controlling the torque converter 22 and for the shifting operation of the transmission T. The electric oil pump 23 is drive controlled by the control unit 1 with the power supply from the battery The torque converter 22 transmits the torque by a spiral flow of the operating oil (ATF: Automatic Transmission Fluid) enclosed inside. In an LC_OFF state where the engagement of the lock-up clutch 21 is cancelled, the torque is transmitted (for example, amplification transmission) from the rotation shaft of the motor M to the input shaft of the transmission T via the operating oil.

Furthermore, in an LC_ON state where the lock-up clutch 21 is set up in the engagement state, the rotation driving force is directly transmitted from the rotation shaft of the motor M to the input shaft of the transmission T and not via the operating oil.

Moreover, a booster BS is linked to the brake pedal (not shown). A master power internal negative pressure sensor S9 which detects the brake master power internal negative pressure is provided in the booster BS.

Moreover, the driving wheel W comprises a brake device 24. The brake device 24 suppresses the generation of rapid behavioral change of the vehicle by control of the control unit 1. For example, it prevents slipping of the driving wheel W on a slippery road surface or the like, suppresses side slip such as oversteering or understeering, prevents the driving wheel W from being in a locked state during braking, ensures the desired driving force and the steering performance of the vehicle, stabilizes the posture of the vehicle, and assists with travelling by means of a creep force, for example, prevents the vehicle from moving backward on a slope when deactivating the internal-combustion engine E.

Inputs to the control unit 1 are: for example: a detection signal from a vehicle speed sensor S1 which detects the travelling speed of the vehicle VP, a detection signal from an engine speed sensor S2 which detects the engine speed NE, a detection signal from a shift position sensor S3 which detects the shift position SH of the transmission T, a detection signal from a brake switch S4 which detects the operating state BR of the brake (Br) pedal, a detection signal from an accelerator pedal opening sensor S5 which detects the accelerator pedal opening AP according to the operation amount of the accelerator pedal, a detection signal from a throttle opening sensor S6 which detects the throttle opening TH, a detection signal from an intake pipe pressure sensor S7 which detects the intake pipe pressure PB, a detection signal from a battery temperature sensor S8 which detects the temperature TBAT of the battery 3, a detection signal from the master power internal negative pressure sensor S9, a detection signal from a POIL sensor S10 which detects the oil pressure of the cylinder deactivation cancellation side path 14 when deactivating the cylinders, a detection signal from a PDU temperature sensor S11 which detects the temperature TPDU of the power drive unit 2, and a detection signal from a DV temperature sensor S12 which detects the temperature TDV of the downverter 5.

Moreover, the control unit 1 comprises: for example: a VSA (Vehicle Stability Assist) ECU 31 which drive controls the brake device 24 to stabilize the behavior of the vehicle, an ACMECU 32 which drive controls the damping device 19 to suppress the generation of car body vibration caused by the operating state of the internal-combustion engine E, a MOTECU 33 which controls the driving and the regenerative operation of the motor M, an A/CECU 34 which drive controls the air conditioning hybrid air conditioning compressor 6 and the air conditioning inverter 7, and an HVECU 35 which monitors and protects the high voltage electrical equipment system comprising for example the power drive unit 2, the battery 3, the downverter 5, and the motor M, and controls the operation of the power drive unit 2 and the downverter 5, and a FI/AT/MGECU 36 The respective VSAECU 31 to 36 are mutually connected communicably. The respective ECUs 31 to 36 are connected to a meter 37 comprising instruments which display the amount of the respective types of states.

Figure 2:
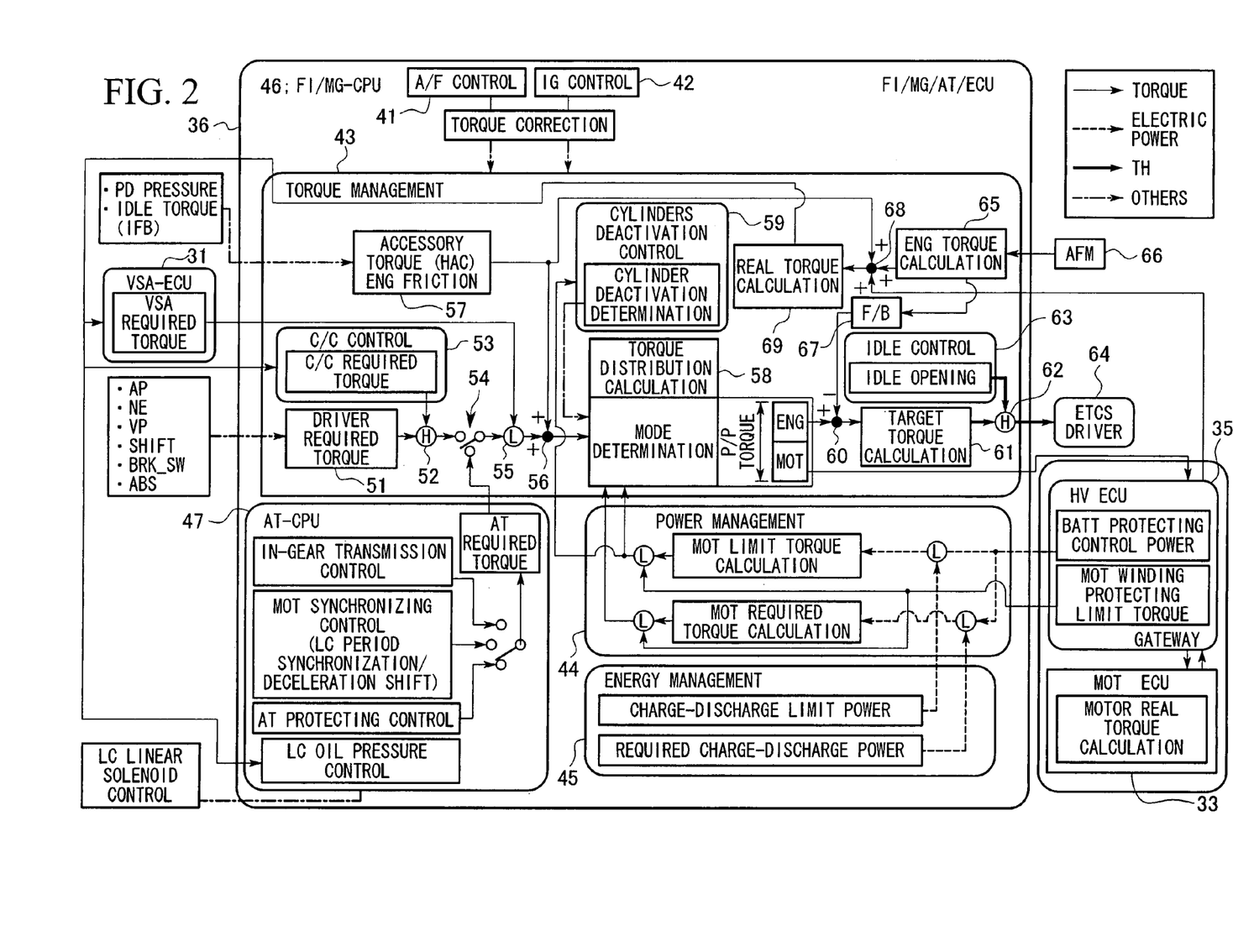
FIG. 2 is a block diagram of the control unit shown in FIG. 1.

For example, as shown in FIG. 2, the FI/AT/MGECU 36 comprises; a FI/MG-CPU 46 installed with an A/F (air/fuel ratio) control unit 41 and an IG (ignition) control unit 42 which control the fuel supply to and the ignition timing of the internal-combustion engine E, a torque management section 43, a power management section 44, and an energy management section 45; and for example an AT-CPU 47 which controls the shifting operation of the transmission T, the operating state of the lock-up clutch 2, and the like.

In the torque management section 43, a driver required torque calculating section 51 calculates the torque value required by a driver of the vehicle (driver required torque) depending on the operation amount of the accelerator by the driver, for example based on respective detection signals from the accelerator pedal (AP) opening, the engine speed NE, the vehicle travelling speed VP, the shift position SH, the operating state of a brake pedal BRK_SW, and the operating state ABS of an antilock brake system which prevents the driving wheels W from being locked during vehicle braking by the brake device 24, and outputs this torque value to a first torque selecting section 52.

Moreover, a C/C (cruise control) unit 53 calculates the torque value (C/C required torque) targeted during the travel control satisfying predetermined traveling conditions previously set according to the input operation of the driver, that is cruise control, for example, such as the constant speed travelling control which controls the internal-combustion engine E and the motor M so that the vehicle travelling speed VP detected in a vehicle speed sensor S1 becomes the target vehicle speed which is the target value of the travelling speed of the vehicle, and follow travel control for following a preceding vehicle while maintaining a predetermined vehicular gap, and outputs the torque value to the first torque selecting section 52.

The first torque selecting section 52 selects the greater torque value of the driver required torque or the C/C required torque, and outputs to the torque switching section 54. Therefore, for example even during cruise control, in the case where the driver required value according to the accelerator operation of the driver of the vehicle is over the C/C required torque, the torque according to the driver required value is output.

The torque switching section 54 selects either one of the torque value input from the first torque selecting section 52 and the AT required value input from the AT-CPU 47, and outputs to a second torque selecting section 55.

The AT-CPU 47 selects either one of the torque values as the AT required torque among, for example; a torque value set during the shifting operation of the transmission T, a torque value targeted when performing synchronizing control which synchronize the period of the input shaft of the transmission T and the rotating speed of the motor M during driving the lock-up clutch 21 or shifting the speed such as shifting down, and a torque value set during protection control of the transmission T in the case where a driver operates the accelerator pedal and the brake pedal at the same time.

Moreover, the AT-CPU 47 electronically controls the oil pressure which drives the lock-up clutch 21 by an LC linear solenoid, and it is possible to set the operation, in addition to the LC_ON state where the lock-up clutch 21 is in the engagement state and the LC_OFF state where the engagement is cancelled, to an intermediate state which generates an appropriate smoothness in the lock-up clutch 21.

The second torque selecting section 55 selects the smaller torque value of the torque value input from the torque switching section 54 and the VSA required torque input from the VSAECU 31, then sets this torque value as a torque of the crankshaft (crankshaft torque), that is the target torque value with respect to the actual rotation of the driving wheels W, and outputs to a first adding section 56.

Moreover, an auxiliary torque-ENG friction calculating section 57 calculates, for example the auxiliary torque (HAC) required for driving the accessories based on the protrusive pressure (PD) of the air conditioner, calculates the torque value in relation to the engine (ENG) friction of the internal-combustion engine E based on the increased amount of the engine friction in a low temperature state compared to a standard for the engine friction value after termination of warming up of the internal-combustion engine E, and outputs to the first adding section 56.

The first adding section 56 sets the value obtained by adding the crank terminal torque and the torque value input from the auxiliary torque–ENG friction calculating section 57, as the power plant (P/P) torque which is the target torque with respect to the torque output from the power plant (that is, the internal-combustion engine E and the motor M), and outputs to a torque distribution calculating section 58.

The torque distribution calculating section 58 selects the required torque mode for instructing the predetermined operating state of the internal-combustion engine E and the motor M based on the cylinder deactivation determination output from the cylinder deactivation control unit 59 for determining whether the cylinder deactivation operation of the internal-combustion engine E should be executed or not, and the limit torque and the required torque with respect to the motor M output from the power management section 44, and according to the selection result, sets the distribution of the power plant torque (P/P) with respect to the respective torque instructions of the internal-combustion engine E and the motor M.

To the cylinder deactivation control unit 59 is input the limit torque for the motor M output from the power management section 44 described later, and according to the limit torque for the motor M, the cylinder deactivation control unit 59 determines whether the cylinder deactivation operation should be executed or not.

The power management section 44 calculates, for example the motor (MOT) limit torque based on the smaller power of the battery (BATT) protecting limit power output from the HVECU 35 and the charge-discharge limit power output from the energy management section 45, then sets the smaller one of the calculated motor limit torque and the motor (MOT) winding protecting limit torque output from the HVECU 35 as the limit torque, and outputs to the torque distribution calculating section 58 and the cylinder deactivation control unit 59.

Moreover, the power management section 44 calculates, for example the motor (MOT) limit torque based on the smaller power of the battery (BATT) protecting limit power output from the HVECU 35 and the required charge-discharge power output from the energy management section 45, then sets the smaller one of the calculated motor limit torque and the motor (MOT) winding protecting limit torque output from the HVECU 35 as the required torque, and outputs to the torque distribution calculating section 58.

The charge-discharge limit power and the required charge-discharge power output from the energy management section 45 are, for example the limited amount and the required amount with respect to charge and discharge set according to the state of charge of the battery 3 and the auxiliary battery 4.

Moreover, the battery (BATT) protecting limit power output from the HVECU 35 is, for example the limit value of the output power of the battery 3 set according to the temperature state of the battery 3, the auxiliary battery 4, and the other high voltage electrical equipment. The motor (MOT) winding protecting limit torque is the limit value of the output torque of the motor M set according to the temperature state of the motor M.

The torque instruction of the internal-combustion engine E calculated by the torque distribution calculating section 58 is input into a subtracting section 60. The subtracting section 60 inputs the value obtained by subtracting the torque value input from the feedback (F/B) processing section 67 described later from the torque instruction of the internal-combustion engine E, to a target TH calculating section 61. The target TH calculating section 61 calculates the target value for the electronic throttle opening TH in relation to the drive of the ETCS driver based on the input torque value, and outputs to a third torque selecting section 62.

The third torque selecting section 62 selects the greater throttle opening value of the target value of the electronic throttle opening TH input from the target TH and the idle opening output from the idle control unit 63, and outputs this throttle opening value to the ETCS driver 64.

The idle opening output from the idle control unit 63 is, for example, a limit value with respect to the throttle opening TH for preventing the engine speed NE from being less than the predetermined rotating speed during the idle operation of the internal-combustion engine E.

Moreover, to the ENG torque calculating section 65 in the torque management section 43 is input a detection signal intake air amount (or supplied oxygen amount) of the internal-combustion engine E detected by an airflow meter (AFM) 66. The ENG torque calculating section 65 calculates the ENG torque output from the internal-combustion engine E based on the detection value of the intake air amount, and outputs to the feed back (F/B) processing section 67 and a second adding section 68.

The feed back (F/B) processing section 67, with respect to the torque instruction of the internal-combustion engine E calculated in the torque distribution calculating section 58, corrects for calculation errors of ENG torque based for example on the detection value of the airflow meter 66, response characteristic or aged deterioration of the internal-combustion engine E, performance irregularities during mass production of the internal-combustion engine E and the like, by feed back processing, and inputs the ENG torque calculated in the ENG torque calculating section 65 to the subtracting section 60.

A third adding section 68 inputs the torque value obtained by adding; the ENG torque calculated in the ENG torque calculating section 65, the torque value input from the auxiliary torque-ENG friction calculating section 57, and the motor real torque input from the MOTECU 33, to the real torque calculating section 69. The real torque calculating section 69 calculates the real torque value which is actually output from the power plant (that is, the internal-combustion engine E and the motor M) based on the input torque value.

To the MOTECU 33 is input the torque instruction of the motor M calculated by the torque distribution calculating section 58 in the torque management section 43, via the HVECU 35. The MOTECU 33 calculates the motor real torque which is actually output from the motor M based on the input torque value, and inputs to the third adding section 68 in the torque management section 43, via the HVECU 35.

Moreover, the real torque value calculated in the real torque calculating section 69 is input to the AT-CPU 47, and based on this real torque value, the oil pressure which drives the lock-up clutch 21 is electronically controlled by an LC linear solenoid.

The respective torque values calculated in the torque management section 43 are corrected according to the ignition timing, the air/fuel ratio, and the presence/absence of the fuel cut (fuel supply cancellation) of the internal-combustion engine E which are controlled in the A/F (air/fuel ratio) control unit 41 and the IG (ignition) control unit 42.

The control apparatus for a hybrid vehicle according to the present embodiment comprises the above construction. Next is a description of an operation of this control apparatus for a hybrid vehicle, particularly, a processing for setting the upper limit value with respect to the motor torque when assisting the output from the internal-combustion engine E by the motor M during the cylinders deactivation operation.

The FI/AT/MGECU 36, integrates for example, the charging state of the battery 3, that is the time-varying amount of the state of charge SOC in the state except for the state where the motor M is operated as a generator by the output from the internal-combustion engine E and the power generated thereby is charged into the battery 3, so as to calculate the regeneration/assistance integrated residual amount DQBATRGN corresponding to the value obtained by subtracting for example, the integrated value of the energy consumption consumed by motor driving of various accessories or when starting the vehicle, from the integrated value of the energy value obtained during the deceleration regeneration of the vehicle, that is the consumable deceleration regenerative energy. Then, the motor charge-discharge torque limit correction coefficient during cylinder deactivation enlargement assistance KCSADQB (for example, KCSADQB<1.0) which changes in an increasing trend according to the increase in this regeneration/assistance integrated residual amount DQBATRGN, is calculated. This motor charge-discharge torque limit correction coefficient during cylinder deactivation enlargement assistance KCSADQB is a correction coefficient which corrects, for example when assisting the output of the internal-combustion engine E by the motor M in an assistance operating mode such as WOT assistance, so as to decrease the energy management discharge torque limit TQMEMLTD, that is the motor torque upper limit set according to the energy state in high voltage electrical equipment and the operating state of vehicle. Then, the value obtained by correcting the energy management discharge torque limit TQMEMLTD by the motor charge-discharge torque limit correction coefficient during cylinder deactivation enlargement assistance KCSADQB is set as the energy management discharge torque limit for cylinder deactivation enlargement assistance TQMLTCSA, for example, as shown in FIG. 3, so as to calculate the torque threshold in the cylinder deactivation region (cylinder deactivation upper limit torque TQACS), according to the energy management discharge torque limit for cylinder deactivation enlargement assistance TQMLTCSA.

Figure 3:
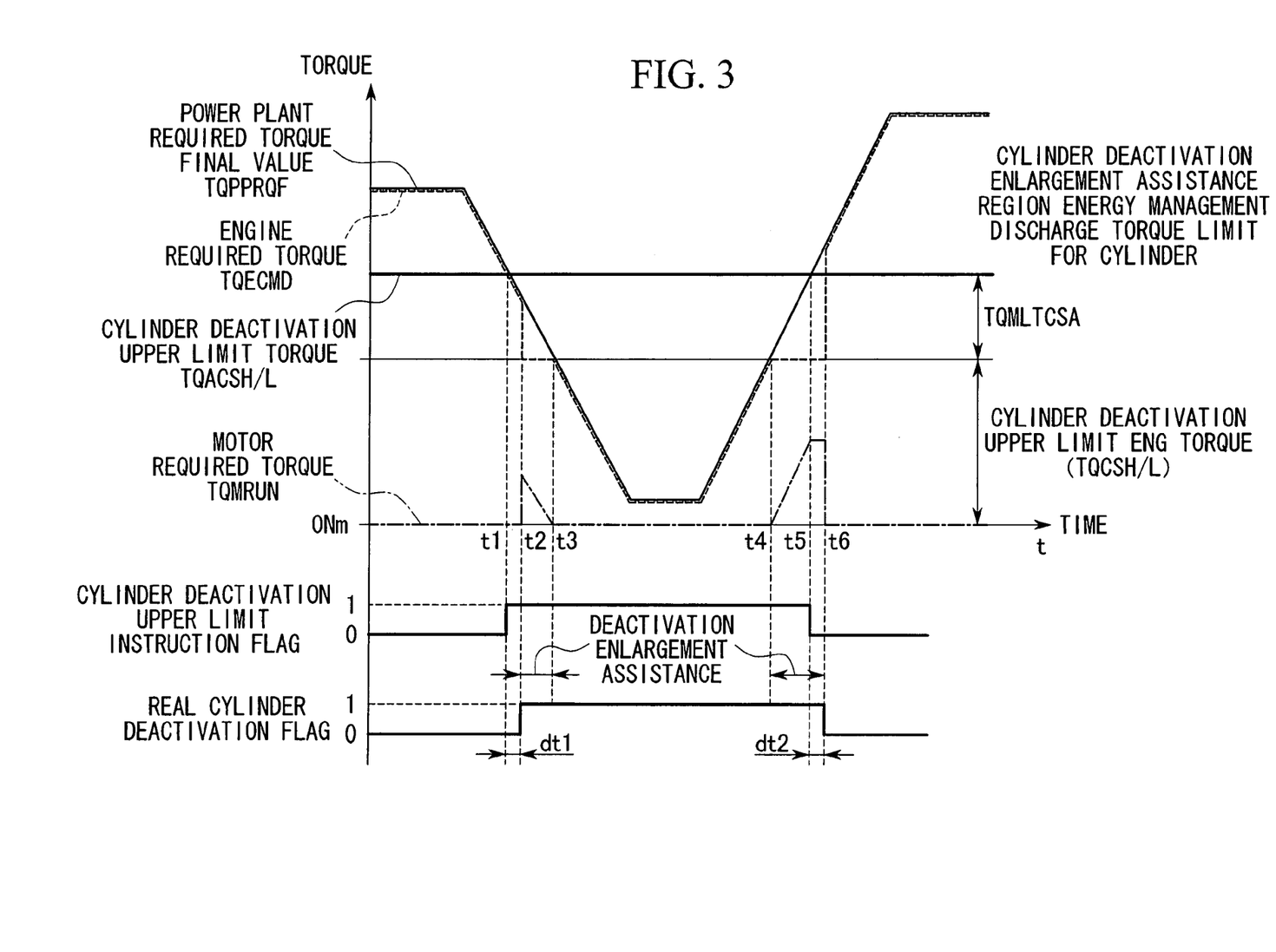
FIG. 3 is a graph showing an example of the change with time of; a power plant required torque final value TQPPRQF, an engine required torque TQECMD, and a motor required torque TQMRUN.

For example, as shown in FIG. 3, in the state where zero is set to the motor required torque TQMRUN, when the power plant required torque final value TQPPRQF and the engine required torque TQECMD are gradually decreased, and reach to the cylinder deactivation upper limit torque TQACS (for example, the low cylinder deactivation upper limit torque TQACSL of the cylinder deactivation upper limit torque TQACS having hysteresis) obtained by adding the cylinder deactivation upper limit ENG torque TQCS and the energy management discharge torque limit for cylinder deactivation enlargement assistance TQMLTCSA), then a "1" is set to the flag value of the cylinder deactivation upper limit instruction flag. Then, according to the change in the flag value of this cylinder deactivation upper limit instruction flag, at time t2 after the passage of an appropriate delay time dt1, the internal-combustion engine E is actually switched from all cylinders operation to the cylinders deactivation operation. Then the cylinder deactivation upper limit ENG torque TQCS is set to the engine required torque TQECMD, and the torque value of the difference between the power plant required torque final value TQPPRQF and the engine required torque TQECMD is set to the motor required torque. As a result, a period from time t2 to time t3 when this motor required torque has a value greater than zero, becomes the cylinder deactivation enlargement assistance region.

Moreover, after the time t3 when zero is set to the motor required torque TQMRUN during the cylinders deactivation operation, the power plant required torque final value TQPPRQF and the engine required torque TQECMD are gradually increased, and at the time t4, reach to the cylinder deactivation upper limit ENG torque TQCS. Then the cylinder deactivation upper limit ENG torque TQCS is set to the engine required torque TQECMD, and the torque value of the difference between the power plant required torque final value TQPPRQF and the engine required torque TQECMD is set to the motor required torque TQMRUN. As a result, a period from time t4 to time t6 when this motor required torque has a value greater than zero, becomes the cylinder deactivation enlargement assistance region. During this period, at time t5, when the power plant required torque final value TQPPRQF reaches to the cylinder deactivation upper limit torque TQACS (for example, the high cylinder deactivation upper limit torque TQACSH of the cylinder deactivation upper limit torque TQACS having hysteresis) obtained by adding the cylinder deactivation upper limit ENG torque TQCS and the energy management discharge torque limit for cylinder deactivation enlargement assistance TQMLTCSA, a "0" is set to the flag value of the cylinder deactivation upper limit instruction flag. Then, according to the change in the flag value of this cylinder deactivation upper limit instruction flag, at time t6 after the passage of an appropriate delay time dt2, the internal-combustion engine E is actually switched from the cylinders deactivation operation to the all cylinders operation, a zero is set to the motor required torque TQMRUN, and the power plant required torque final value TQPPRQF and the engine required torque TQECMD are set to the equivalent value.

Hereunder is a description of a processing which calculates the regeneration/assistance integrated residual amount DQBATRGN with reference to the flowcharts.

Figure 4:
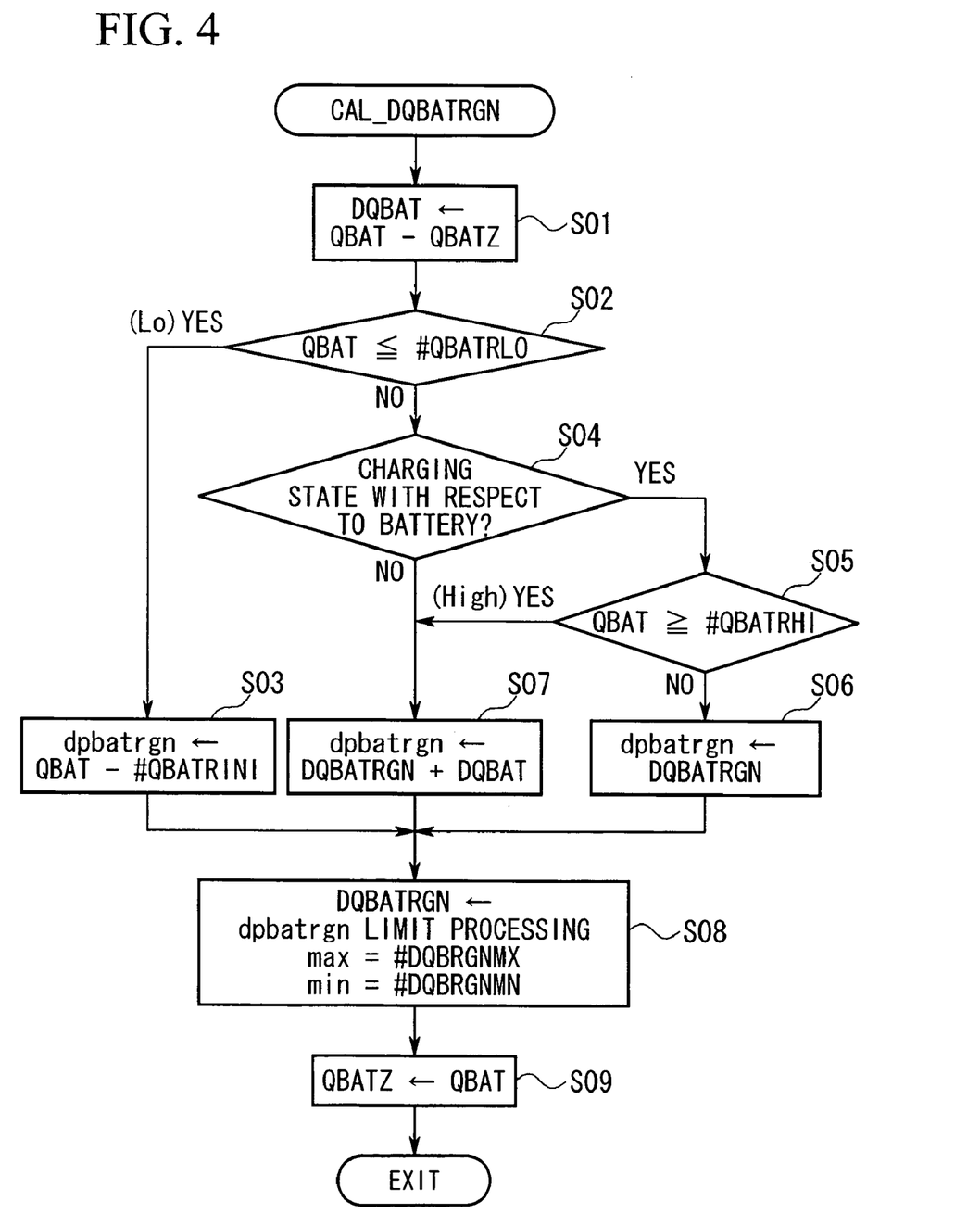
FIG. 4 is a flowchart showing a processing which calculates a regeneration/assistance integrated residual amount DQBATRGN.

Firstly, in step S01 shown in FIG. 4, a value obtained by subtracting from the state of charge of battery QBAT (present value), the state of charge of the battery QBATZ (previous value) in the previous processing is set to a changed state of charge of the battery DQBAT.

Next, in step S02, it is determined whether the state of charge of the battery QBAT (present value) is less than the predetermined regeneration/assistance integrated QBAT lower limit value #QBATRLO or not.

If this determination is "NO", the flow proceeds to step S04 described later.

On the other hand, if this determination is "YES", the flow proceeds to step S03.

Next, in step S03, it is determined whether a value obtained by subtracting from the state of charge of battery QBAT (present value), a predetermined regeneration/assistance integrated initial standard residual amount QBATRINI is set to a regeneration/assistance integrated residual amount dqbatrgn (present value), and the flow proceeds to step S08 described later.

Moreover, in step S04, it is determined whether the state is the charging state with respect to the battery 3 or not.

If this determination is "NO", the flow proceeds to step S07 described later.

On the other hand, if this determination is "YES", the flow proceeds to step S05.

In step S05, it is determined whether the state of charge of battery QBAT (present value) is greater than a predetermined regeneration/assistance integrated QBAT upper limit value #QBATRHI or not.

If this determination is "YES", the flow proceeds to step S07 described later.

On the other hand, if this determination is "NO", the flow proceeds to step S06.

In step S06, the regeneration/assistance integrated residual amount dqbatrgn (previous value) is set to the regeneration/assistance integrated residual amount dqbatrgn (present value), and the flow proceeds to step S08 described later.

Moreover, in step S07, a value obtained by adding the regeneration/assistance integrated residual amount DQBATRGN (previous value) and the changed state of charge of battery DQBAT is set to the regeneration/assistance integrated residual amount dqbatrgn (present value).

Next, in step S08, a value obtained by executing a limit processing by the predetermined regeneration/assistance integrated residual amount lower limit value #DQBRGNMN and the regeneration/assistance integrated residual amount upper limit value #DQBRGNMX, with respect to the regeneration/assistance integrated residual amount dqbatrgn, is newly set to the regeneration/assistance integrated residual amount DQBATRGN.

Next, in step S09, the state of charge of battery QBAT is newly set to the state of charge of battery QBATZ, and the series of processing is terminated.

The arrangement such that the abovementioned determination in step S05 becomes "YES" in order to execute the processing of step S07 even in the charging state with respect to the battery 3, is due to the reset processing executed with respect to the state of charge SOC of the battery 3 (the state of charge equivalent to QBAT). That is, the state of charge SOC of the battery 3 (the state of charge equivalent to QBAT) corresponds to the total amount of the electric charge stored in the battery 3. Therefore, for example the integrated charging current and the integrated discharging current are calculated by integrating the charging current and the discharging current of the battery 3 for every predetermined period, and the integrated charging current and the integrated discharging current are added to or subtracted from the state of charge in the initial state or immediately before the charge-discharge start, to thereby calculate the state of charge SOC of the battery 3. However, there may be some cases where, for example, when calculating the integrated charging current and the integrated discharging current, measurement errors of the current detector are accumulated so as to increase the error in the state of charge. Therefore, the arrangement is such that for example, a predetermined upper limit SOC is set to the state of charge SOC when the interterminal voltage of the battery 3 becomes greater than a predetermined upper limit voltage, and conversely a predetermined lower limit SOC is set to the state of charge SOC when the interterminal voltage of the battery 3 becomes less than a predetermined lower limit voltage, to thereby perform the reset processing with respect to the state of charge SOC. This reset processing uses, for example the state of charge characteristic of the battery 3 such as a Ni-MH battery for which the interterminal voltage of the battery 3 relatively changes greatly in the vicinity of the upper limit (upper limit SOC) and the lower limit (lower limit SOC)) of the state of charge SOC.

Figure 5:
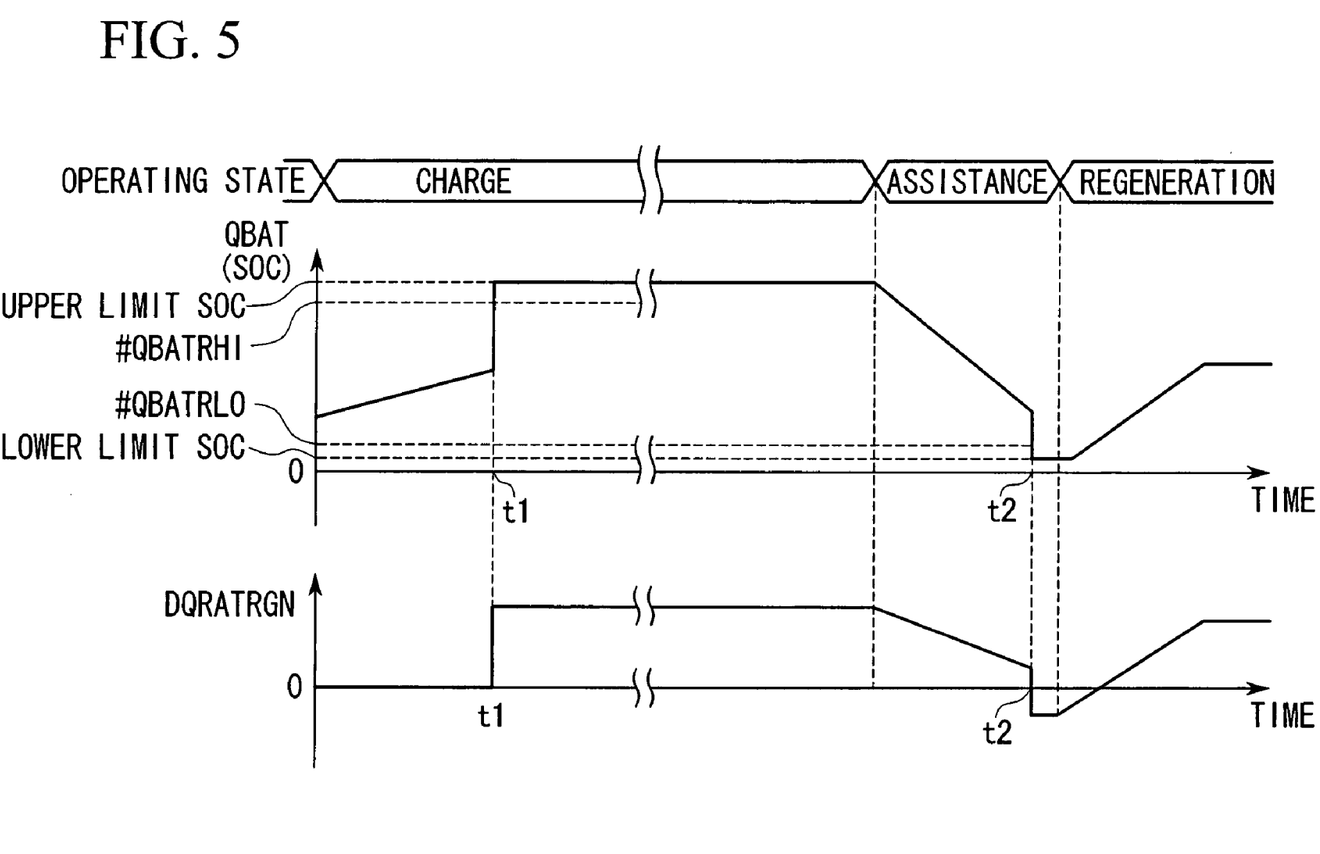
FIG. 5 is a graph showing an example of the change with time of; a state of charge of battery QBAT and a regeneration/assistance integrated residual amount DQBATRGN.

Therefore, accompanying the reset processing of the state of charge SOC, for example as shown in FIG. 5, in the case where the state of charge SOC is replaced by the predetermined upper limit SOC, so as to become greater than the predetermined regeneration/assistance integrated QBAT upper limit value #QBATRHI (for example, time t1 in FIG. 5), the changed state of charge of battery DQBAT corresponding to the increased amount of the state of charge SOC accompanying the reset processing is added to the regeneration/assistance integrated residual amount DQBATRGN.

Moreover, in step S02 to step S03 described above, corresponding to the reset processing in the case where the state of charge SOC is replaced by the predetermined lower limit SOC so as to become less than the predetermined regeneration/assistance integrated QBAT lower limit value #QBATRLO (for example, time t2 in FIG. 5), from the state of charge of battery QBAT (present value) is subtracted the predetermined regeneration/assistance integrated initial standard residual amount QBATRINI.

Hereunder is a description of a processing which calculates the energy management discharge torque limit for cylinder deactivation enlargement assistance TQMLTCSA, with reference to the flowcharts.

Figure 6:
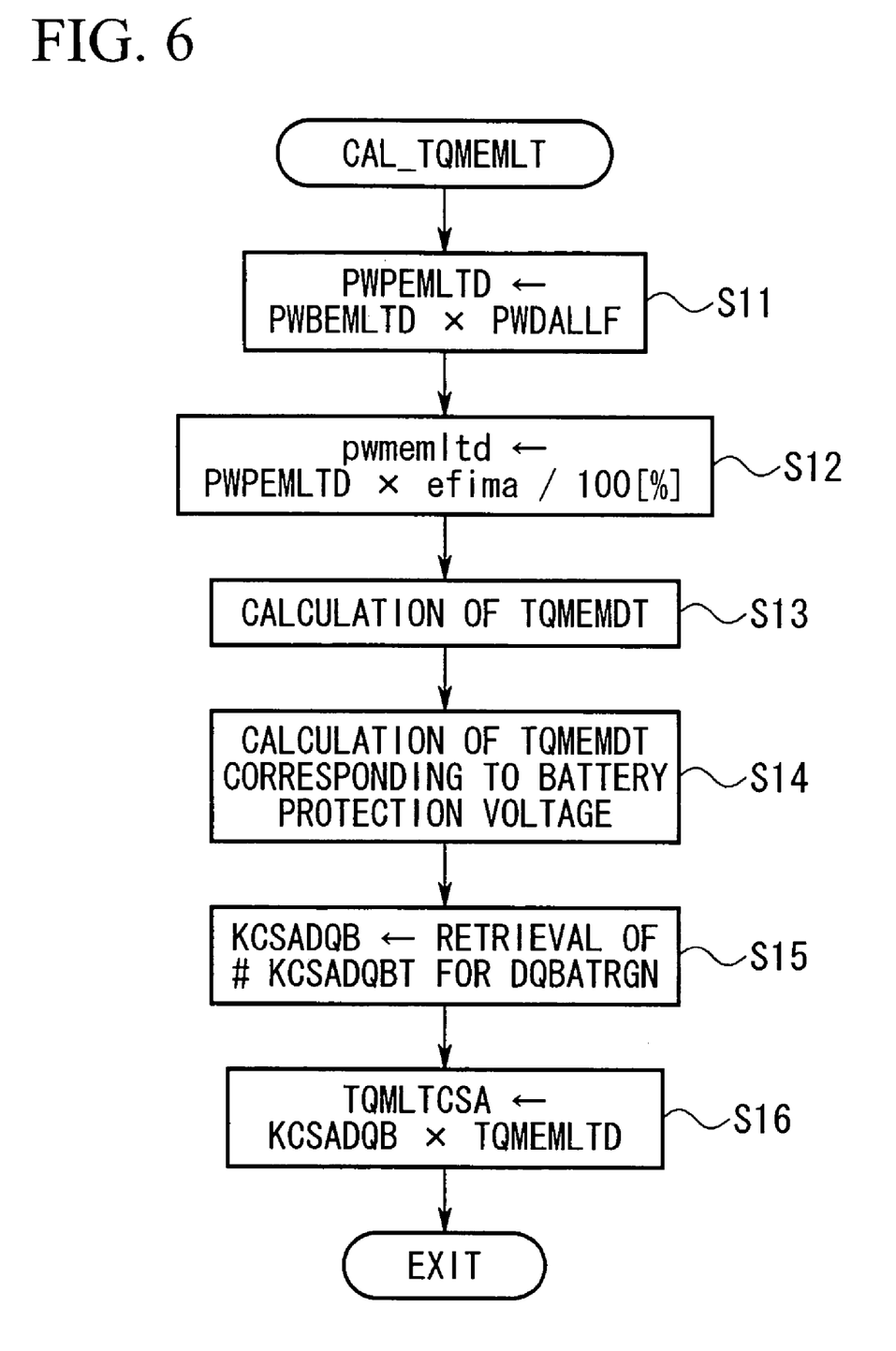
FIG. 6 is a flowchart showing a processing which calculates an energy management discharge torque limit for cylinder deactivation enlargement assistance TQMLTCSA.

Firstly, in step S11 shown in FIG. 6, a value obtained by multiplying, for example, the high voltage accessory load power minimum value PWDALLF which is the minimum value of the power consumption of the various accessories of 12 volts, by the energy management PDU terminal discharge power limit PWBEMLTD which is the discharge power limit value at the input-output terminals in the power drive unit 2 set according to the energy state in high voltage electrical equipment (for example, the input-output terminals connected with the battery 3, the downverter 5, and the air condition inverter 7 in FIG. 1) is set to the energy management discharge power limit PWPEMLDT which is the continuously dischargeable power from the battery 3.

Next, in step S12, a value obtained by multiplying the energy management discharge power limit PWPEMLDT by a predetermined PDU-MOT overall efficiency efima which is the conversion efficiency of the electric power and the motive power between the power drive unit 2 and the motor M, is set to an energy management shaft output limit pwmemltd which is the output with respect to the shaft end of the crankshaft (crank end), that is the rotation shaft of the motor M. The PDU-MOT overall efficiency efima is calculated based on, for example, the energy management discharge power limit PWPEMLDT, the rotating speed of the motor M, and the input-output power of the power drive unit 2.

Next, in step S13, for example, based on the energy management discharge shaft output limit pwmemltd which is the power value, and the rotating speed of the motor M, the torque at the shaft end of the crankshaft (crank end) is calculated. With respect to the calculated torque, upper-lower limit processing is performed based on a motor protecting drive torque limit TQMPRTD for protecting the motor M and a predetermined limit value tpmemltt for when converting the energy management discharge shaft output limit pwemeltd into the torque value. Then, the energy management discharge power limit torque conversion value TQMEMDT obtained by converting the energy management discharge shaft output limit pwmemltd which is the output value, is calculated.

Next, in step S14, the smaller value of; the value obtained by correcting for example, the energy management discharge power limit torque conversion value TQMEMDT corresponding to the predetermined protection voltage with respect to the battery, and the predetermined discharge power limit torque corresponding to the protection voltage of the battery 3, is set to the energy management discharge torque limit TQMEMLTD.

Figure 7:
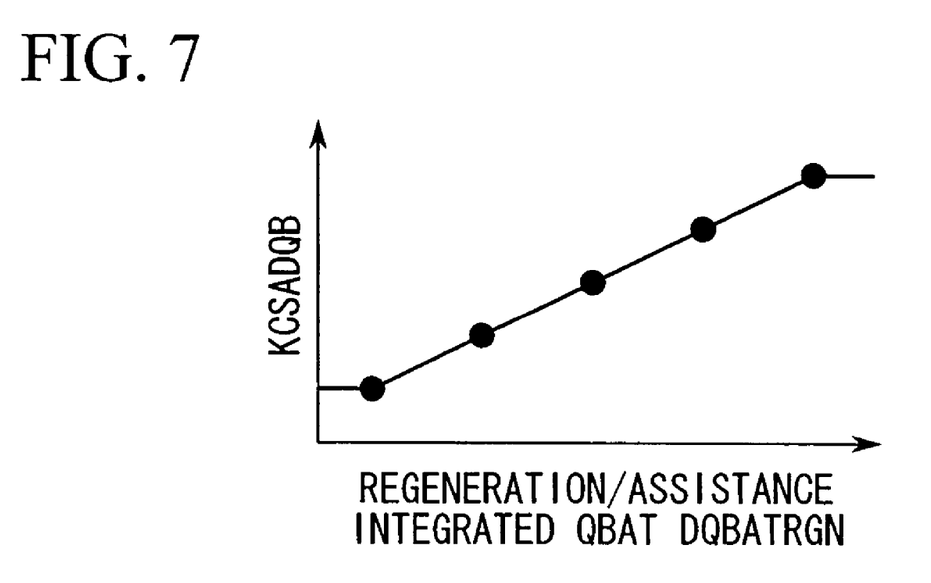
FIG. 7 is a graph showing a motor charge-discharge torque limit correction coefficient KCSADQB for during cylinder deactivation enlargement assistance, which changes in an increasing trend according to an increase in the regeneration/assistance integrated residual amount (QBAT) DQBATRGN.

Next, in step S15, for example, as shown in FIG. 7, a predetermined table of the motor charge-discharge torque limit correction coefficient #KCSADQBT for during cylinder deactivation enlargement assistance, which changes in an increasing trend corresponding to an increase in the regeneration/assistance integrated residual amount (QBAT) DQBATRGN, is retrieved so as to set the motor charge-discharge torque limit correction coefficient during cylinder deactivation enlargement assistance KCSADQB.

Next, in step S16, a value obtained by multiplying the energy management discharge torque limit TQMEMLTD by the motor charge-discharge torque limit correction coefficient KCSADQB for during cylinder deactivation enlargement assistance, is set as the energy management discharge torque limit for cylinder deactivation enlargement assistance TQMLTCSA.

Hereunder is a description of a processing which calculates the torque threshold of the cylinder deactivation region (cylinder deactivation upper limit torque TQACS) corresponding to the energy management discharge torque limit for cylinder deactivation enlargement assistance TQMLTCSA, with reference to the flowcharts.

Figure 8:
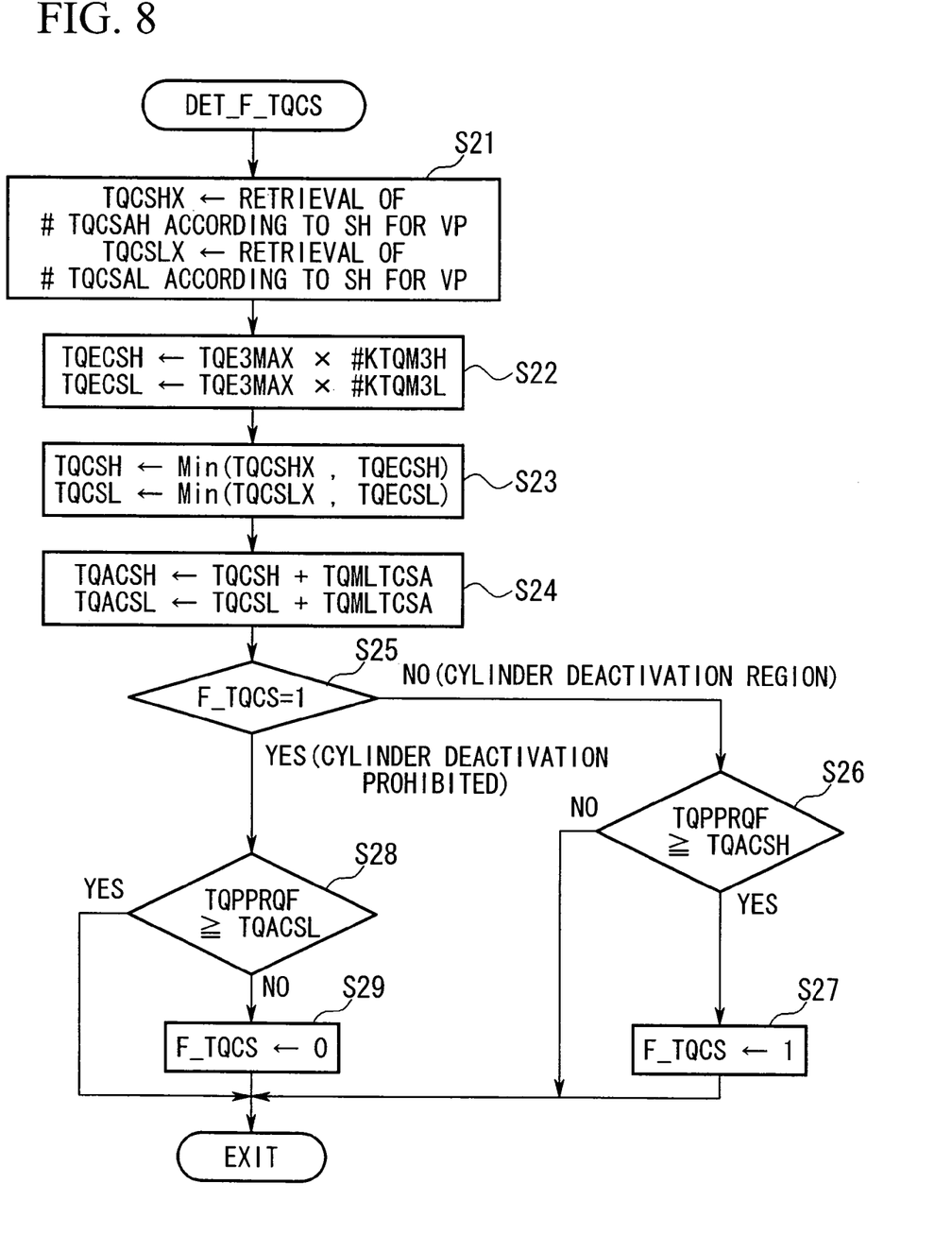
FIG. 8 is a flowchart showing a processing which calculates a torque threshold for a cylinder deactivation region (cylinder deactivation upper limit torque TQACS).

Firstly, in step S21 shown in FIG. 8, the cylinder deactivation upper limit ENG torque #TQCSA which changes corresponding to the vehicle speed VP for each shift position SH of transmission T detected by the shift position sensor S3, is retrieved from a table, and the cylinder deactivation upper limit ENG torque TQCS which is the upper limit value of the ENG torque that approves the execution of the cylinders deactivation operation is set. The cylinder deactivation upper limit ENG torque TQCS is a value having hysteresis (that is, a high cylinder deactivation upper limit ENG torque TQCSHX and a low cylinder deactivation upper limit ENG torque TQCSLX), and different tables are retrieved corresponding to vehicle speed VP for each of the respective cylinder deactivation upper limit ENG torques TQCSHX and TQCSLX.

Next, in step S22, a value obtained by multiplying the ENG maximum torque during cylinder deactivation TQE3MAX obtained by correcting the maximum value of ENG torque capable of being output from the internal-combustion engine E during cylinders deactivation operation according to the environment such as atmospheric pressure by, for example, the predetermined coefficient #KTQM3H, #KTQM3L having hysteresis for changing to decrease the ENG maximum torque during cylinder deactivation TQE3MAX based on the magnitude correlation of the fuel consumption efficiency between the all cylinders operation and the cylinders deactivation operation according to the retard amount for suppressing the knock generation in the internal-combustion engine E (for example, delayed amount of ignition timing), is set to the ENG torque during cylinder deactivation TQECS having hysteresis (that is, high ENG torque during cylinder deactivation TQECSH, and low torque during cylinder deactivation TQECSL).

Next, in step S23, the smaller of; the cylinder deactivation upper limit ENG torque TQCS having hysteresis in each shift position SH (that is, high cylinder deactivation upper limit ENG torque TQCSHX and low cylinder deactivation upper limit ENG torque TQCSLX), and the ENG torque during cylinder deactivation TQECS having hysteresis (that is, high ENG torque during cylinder deactivation TQECSH and low ENG torque during cylinder deactivation TQECSL), is set to the cylinder deactivation upper limit ENG torque TQCS having hysteresis (that is, high cylinder deactivation upper limit ENG torque TQCSH and low cylinder deactivation upper limit ENG torque TQCSL).

Next, in step 24, a value obtained by adding the cylinder deactivation upper limit ENG torque TQCS having hysteresis (that is, high cylinder deactivation upper limit ENG torque TQCSHX and low cylinder deactivation upper limit ENG torque TQCSLX) and the energy management discharge torque limit for cylinder deactivation enlargement assistance TQMLTCSA, is set to the cylinder deactivation upper limit torque TQACS having hysteresis (that is, high cylinder deactivation upper limit torque TQACSH and low cylinder deactivation upper limit torque TQACSL).

Next, in step S25, it is determined whether the flag value of an all cylinder region determination flag F_TQCS which shows that the power plant required torque final value TQPPRQF is in the all cylinder region, is "1" or not.

If this determination is "YES" (all cylinder region and cylinder deactivation is prohibited), the flow proceeds to step S28 described later.

On the other hand, if this determination is "NO" (cylinder deactivation region), the flow proceeds to step S26.

In step S26, it is determined whether the power plant required torque final value TQPPRQF is greater than or equal to the high cylinder deactivation upper limit torque TQACSH or not.

If this determination is "YES", the flow proceeds to step S27 where a "1" is set to the flag value of the all cylinder region determination flag F_TQCS, and the series of processing is terminated.

On the other hand, if this determination is "NO", the flag value of the all cylinder region determination flag F_TQCS is not changed, and the series of processing is terminated.

In step S28, it is determined whether the power plant required torque final value TQPPRQF is greater than or equal to the low cylinder deactivation upper limit torque TQACSL or not.

If this determination is "NO", the flow proceeds to step S27 where a "0" is set to the flag value of the all cylinder region determination flag F_TQCS, and the series of processing is terminated.

On the other hand, if this determination is "YES", the flag value of the all cylinder region determination flag F_TQCS is not changed, and the series of processing is terminated.

As described above, according the control apparatus for a hybrid vehicle according to the present embodiment, by using the energy obtained by the deceleration regenerative operation only for the assisting operation of the motor M in the cylinder deactivation enlargement region, for example, the battery 3 may be kept from being in the over discharging state and the desired driving force may be maintained in the assisting operation by the motor M during the high load travelling. Also together with this, for example due to the generation energy obtained by generation in the motor M by the output from the internal-combustion engine E, the fuel consumption efficiency can be improved, compared to the case where the cylinders deactivation operation region is enlarged.

As described above, according to the control apparatus for a hybrid vehicle of the present invention described in the first aspect, by performing the assisting operation according to the regeneration/assistance amount integrated value, that is the consumable energy amount due to the assisting operation of motor, of the deceleration regenerative energy collected by the deceleration regeneration of motor, the state of charge of the power storage unit can be kept from being over decreased. Therefore, the desired assisting amount can be maintained for example during the high load travelling, and also, for example due to the output from the internal-combustion engine E, power can be generated in the motor, and the frequency for charging the power storage unit can be decreased so as to improve the fuel consumption efficiency.

Furthermore, according to the control apparatus for a hybrid vehicle of the present invention described in the second aspect, when enlarging the cylinders deactivation operation region by increasing the cylinder deactivation upper limit torque to greater then the upper limit value of engine torque, by performing the assist operation according to the consumable energy amount due to the assisting operation of motor, of the deceleration regenerative energy collected by the deceleration regeneration of motor, the fuel consumption efficiency can be kept from being deteriorated.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A control apparatus for a hybrid vehicle which comprises an internal-combustion engine and a motor as a power source, and a power storage unit which transfers electric energy with said motor, and at least one of said internal-combustion engine and said motor is connected to driving wheels of the vehicle through a transmission so as to transmit a driving force to said driving wheels, wherein said control apparatus comprises:

an upper limit motor torque calculating device which sets an upper limit value of motor torque capable of being output from said motor during an assisting operation which assists the output of said internal-combustion engine by the output from said motor, according to an energy state in high voltage electrical equipment constituting said power storage unit;

a regeneration/assistance amount integrated value calculating device which calculates a regeneration/assistance amount integrated value corresponding to an integrated value of a value obtained by subtracting an energy consumption in the vehicle from a deceleration regenerative energy generated due to a regenerating operation of said motor during vehicle deceleration, based on the state of charge of said power storage unit;

a correction coefficient setting device which sets a correction coefficient which corrects for a decrease in the upper limit value of said motor torque according to said regeneration/assistance amount integrated value; and a motor assistance region decreasing device which restricts said motor torque to below a correction upper limit value obtained by correcting the upper limit value of said motor torque by said correction coefficient.

2. A control apparatus for a hybrid vehicle according to claim 1, wherein said internal-combustion engine is capable of being switched between an all cylinder operation which operates all cylinder and a cylinder deactivation operation which partially deactivates the cylinders operation, and said control apparatus comprises;

a cylinder deactivation operation region enlarging device which sets a value obtained by adding to said motor torque an upper limit value of an engine torque capable of being output from said internal-combustion engine during said cylinder deactivation operation, to a cylinder deactivation upper limit torque which is an upper limit determination threshold when determining whether it is possible to execute said cylinder deactivation operation or not;

a cylinder deactivation operation controlling device which sets said internal-combustion engine to the cylinder deactivation operating state in the case where a target torque with respect to a crank end torque which is the torque at the shaft end of the crankshaft, of a power plant torque output from a power plant comprising said internal-combustion engine and said motor, is less than said cylinder deactivation upper limit torque; and a cylinder deactivation assistance region decreasing device which restricts, when operating said cylinder deactivation operation region enlarging device, said motor torque to a value under said correction upper limit value obtained by said motor assistance region decreasing device.

* * * * *